US008935086B2

(12) United States Patent
Sadekar et al.

(10) Patent No.: US 8,935,086 B2
(45) Date of Patent: Jan. 13, 2015

(54) COLLISION AVOIDANCE SYSTEM AND METHOD OF DETECTING OVERPASS LOCATIONS USING DATA FUSION

(75) Inventors: Varsha Sadekar, Sterling Heights, MI (US); Sarmad Y. Hermiz, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2034 days.

(21) Appl. No.: 11/671,489

(22) Filed: Feb. 6, 2007

(65) Prior Publication Data

US 2008/0189039 A1 Aug. 7, 2008

(51) Int. Cl.

| | |
|---|---|
| ***G01S 13/93*** | (2006.01) |
| ***G08G 1/16*** | (2006.01) |
| ***B60W 30/08*** | (2012.01) |
| ***G08G 1/0967*** | (2006.01) |
| *G01S 13/06* | (2006.01) |
| *G01S 17/06* | (2006.01) |

(52) U.S. Cl.

CPC .... *G08G 1/096741* (2013.01); *G08G 1/096716* (2013.01); *G08G 1/096791* (2013.01); *G08G 1/16* (2013.01)

USPC .......................................................... 701/301

(58) Field of Classification Search

CPC .............. G08G 1/16; G08G 1/096716; G08G 1/096741; G08G 1/096791

USPC ................... 180/167–169; 340/435; 342/455; 701/301

See application file for complete search history.

(56) References Cited

U.S. PATENT DOCUMENTS

| | | | | |
|---|---|---|---|---|
| 5,587,929 | A * | 12/1996 | League et al. | 342/159 |
| 6,047,234 | A * | 4/2000 | Cherveny et al. | 701/451 |
| 6,317,691 | B1 * | 11/2001 | Narayan et al. | 701/301 |
| 6,438,491 | B1 * | 8/2002 | Farmer | 701/301 |
| 6,658,336 | B2 * | 12/2003 | Browne et al. | 701/45 |
| 6,832,156 | B2 * | 12/2004 | Farmer | 701/301 |
| 6,897,802 | B1 * | 5/2005 | Daniell et al. | 342/90 |

(Continued)

FOREIGN PATENT DOCUMENTS

JP 6-206507 A 10/2006

OTHER PUBLICATIONS

Yang Chen. "Highway Overhead Structure Detection Using Video Image Sequences." IEEE Transactions on Intelligent Transportation Systems. vol. 4, No. 2. pp. 67-77. Jun. 2003.*

(Continued)

*Primary Examiner* — Khoi Tran
*Assistant Examiner* — Dale Moyer

(57) ABSTRACT

A collision avoidance system adapted for use with a vehicle, and a method of modifying a first warning assessment algorithm of the system to reduce false alerts caused by overpasses, and maintain sufficient warning distances are presented, wherein the system includes at least one sensor operable to detect an object location, a locator device operable to determine the current position coordinates of the vehicle, a map database presenting a plurality of overpass locations ahead of the vehicle, and an electronic control unit operable to execute a second algorithm, if the detected object location generally matches an overpass location, and in a preferred embodiment, a third algorithm, if the detected location does not match an overpass location, such that the third algorithm is executable over a shorter period than the second, and the second algorithm is executable over a shorter period than the first.

19 Claims, 6 Drawing Sheets

(56) References Cited

U.S. PATENT DOCUMENTS

| | | | | |
|---|---|---|---|---|
| 7,027,615 | B2 * | 4/2006 | Chen | 382/104 |
| 7,584,047 | B2 | 9/2009 | Igarashi | |
| 7,592,945 | B2 * | 9/2009 | Colburn et al. | 342/70 |
| 2002/0106135 | A1 * | 8/2002 | Iwane | 382/305 |
| 2002/0161513 | A1 * | 10/2002 | Bechtolsheim et al. | 701/208 |
| 2002/0169533 | A1 * | 11/2002 | Browne et al. | 701/45 |
| 2003/0002713 | A1 * | 1/2003 | Chen | 382/104 |
| 2003/0004644 | A1 * | 1/2003 | Farmer | 701/301 |
| 2005/0149251 | A1 * | 7/2005 | Donath et al. | 701/200 |
| 2006/0106538 | A1 * | 5/2006 | Browne et al. | 701/301 |
| 2007/0016372 | A1 * | 1/2007 | Browne et al. | 701/213 |
| 2009/0002222 | A1 * | 1/2009 | Colburn et al. | 342/145 |

OTHER PUBLICATIONS

Srinivasa, N.; Yang Chen; Daniell, C. "A fusion system for real-time forward collision warning in automobiles." IEEE Transactions on Intelligent Transportation Systems. vol. 1, pp. 457-462. Oct. 2003.*

NHTSA. United States Department of Transportation, National Highway Traffic Safety Administration. (2000). Automotive collision avoidance systems (acas) program final report (DOT HS 809 080). Springfield, VA: National Technical Information Service.*

* cited by examiner

COLLISION AVOIDANCE SYSTEM AND METHOD OF DETECTING OVERPASS LOCATIONS USING DATA FUSION

BACKGROUND OF THE INVENTION

1. Technical Field

The present invention relates to vehicular collision avoidance and mitigation systems, and more particularly, to a digital map and sensory based collision avoidance system that utilizes data fusion to identify overpasses and modify a threat assessment algorithm, so as to maintain sufficient warning distances, and reduce false alerts.

2. Background Art

A prevailing concern in current implementations of collision avoidance and warning systems in vehicles is that they typically present a significant number of false alerts (i.e. warnings of imminent collisions with objects that are not in fact within the vehicle path). This concern is especially perpetuated by the proximity of stationary objects, the current limitations in accurate prediction of forward path, and the inability of the radar to discriminate between objects present at different elevations. False alerts in conventional systems are often caused by overpasses, mailboxes on the roadside, staled vehicles, etc.

Overpasses are of particular concern for various reasons. First, they are present in great numbers on interstate highways and other thoroughfares. Second, they are typically found traversing the path of thoroughfares having a relatively high speed limit. Third, they are difficult to distinguish from in-path objects that present true potential collisions. Fourth, and perhaps most concerning, current overpass detection algorithms that analyze the signal-strength trend of the approaching object are generally unable to provide sufficient warning distances, when a true potential collision, and not an overpass, is determined.

With respect to the later, once an object is detected at an initial threshold distance, the trend in the radar return signal strength over a plurality of diminishing distances (see, FIGS. 1 through 3*a*) is assessed to determine the signature signal pattern. Due to the necessity to obtain trend data, however, overpass determination under this and similar methodology often results in the warning being issued at shorter "definite detection" distances, sometimes as short as 60 meters. It is appreciated that a vehicle traveling at the speed of 70 mph (31 meters/sec) requires a warning distance of 150 meters or more in order to allow the vehicle to be stopped before reaching the object (assuming a 1-sec reaction time, and a 0.4 g deceleration).

Thus, to be effective a collision avoidance system must provide reliable and efficient warning distances to the operator, and, therefore, be capable of timely distinguishing false concerns caused by overpasses from potential collisions caused by true in-path objects.

SUMMARY OF THE INVENTION

Responsive to these and other concerns caused by conventional collision avoidance and mitigation systems, the present invention presents an improved collision avoidance system that utilizes data fusion to more rapidly and accurately determine the presence of overpasses.

A first aspect of the present invention concerns a collision avoidance system adapted for use with a host vehicle, and by an operator. The system includes at least one sensor configured to detect an object located a minimum threshold distance from the vehicle, so as to determine a detected object location, and a map database including a plurality of intersecting links, and denoting overpass locations. The system further includes a locator device communicatively coupled to the map database, and configured to detect the current position coordinates of the vehicle within the map database. Finally, the system includes an electronic control unit communicatively coupled to the sensor, database, and device, and programmably configured to autonomously execute a warning assessment algorithm, compare the detected object location with the overpass locations, so as to determine whether the detected object location is generally at an overpass location, modify the warning assessment algorithm, when the detected object location is at a general overpass location, and cause a warning perceivable by the operator to be generated or a mitigating action to be initiated, when the execution of the algorithm detects a potential collision.

A second aspect of the present invention concerns a method of modifying a first warning assessment algorithm of the system, so as to reduce false alerts caused by overpasses, while maintaining sufficient warning distances. The method generally begins with the steps of autonomously determining the current position coordinates, and heading of the vehicle, and retrieving the position coordinates of at least one overpass location within a predetermined vicinity ahead of the vehicle from a database. Next, an approaching object at least a minimum threshold distance from the vehicle is detected, and the detected position coordinates of the object are determined. The detected position coordinates are compared to the position coordinates of said at least one overpass location from the database. Finally, a second algorithm is executed, if the detected coordinates generally match the position coordinates of a database overpass location, and a third algorithm is executed, if the detected coordinates do not match the position coordinates of a database overpass location, wherein said third algorithm is executable over a shorter period than the second, and the second algorithm is executable over a shorter period than the first.

It will be understood and appreciated that the present invention provides a number of advantages over the prior art, including, for example, further utilizing pre-existing in-vehicle navigation and map database systems, enabling more efficient, reliable, and accurate overpass determination, allowing the full radar range to be utilized for warning or mitigation, and adding redundancy where a plurality of overlapping sensors are utilized. Other aspects and advantages of the present invention will be apparent from the following detailed description of the preferred embodiment(s) and the accompanying drawing figures.

BRIEF DESCRIPTION OF THE DRAWINGS

A preferred embodiment of the present invention is described in detail below with reference to the attached drawing figures, wherein.

DESCRIPTION OF THE PREFERRED EMBODIMENT(S)

Figure 3A:
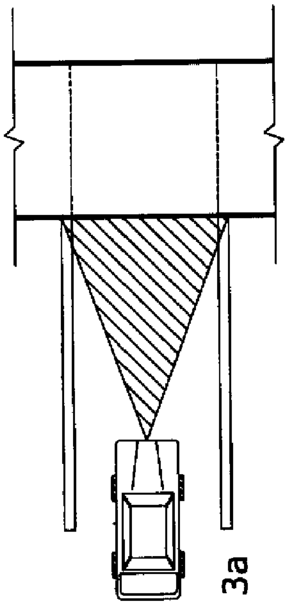
FIG. 3*a* is a plan view of the vehicle and approaching object shown in FIG. 3, further illustrating the third range and return signal strength.
Figure 2A:
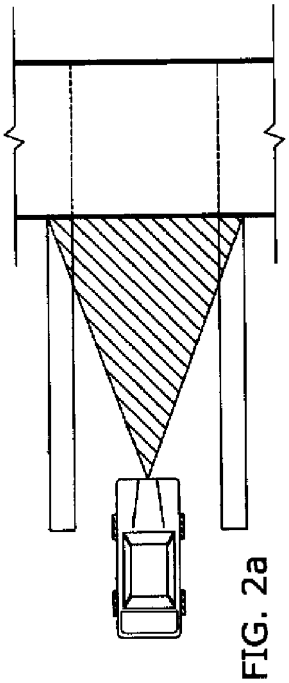
FIG. 2*a* is a plan view of the vehicle and approaching object shown in FIG. 2, further illustrating the second range and return signal strength.
Figure 1A:
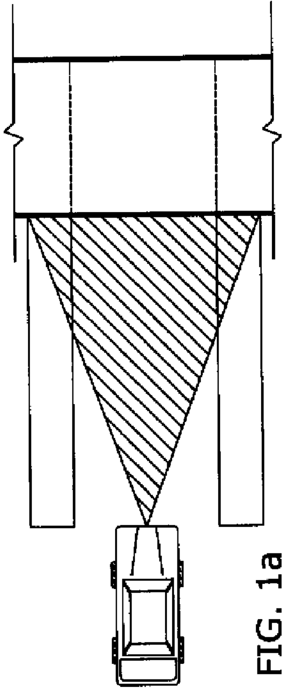
FIG. 1*a* is a plan view of the vehicle and approaching object shown in FIG. 1, further illustrating the initial range and return signal strength.
Figure 3:
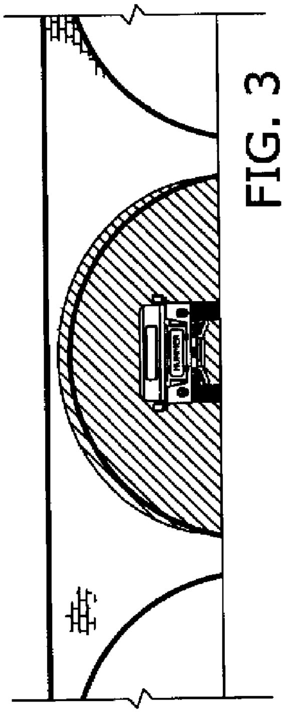
FIG. 3 is a rear elevation view of the vehicle detecting the approaching object, particularly illustrating a third detection range and return signal strength.
Figure 2:
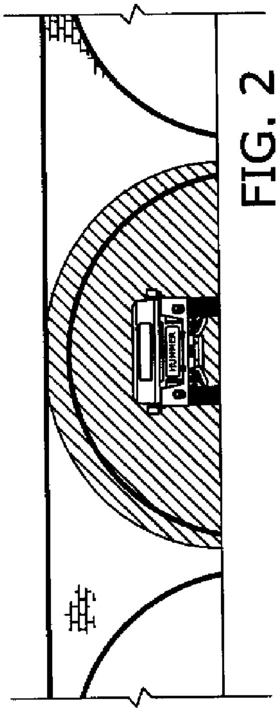
FIG. 2 is a rear elevation view of the vehicle detecting the approaching object, particularly illustrating a second detection range and return signal strength.
Figure 1:
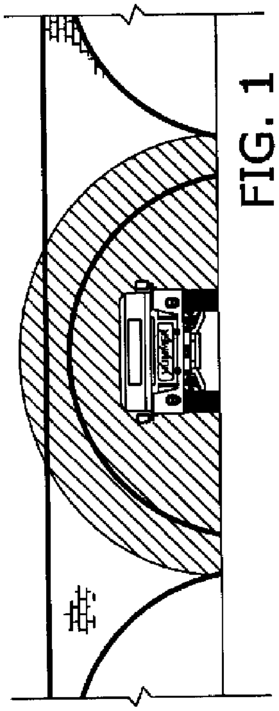
FIG. 1 is a rear elevation view of a vehicle detecting an approaching object (overpass), particularly illustrating an initial detection range and return signal strength.
Figure 4:
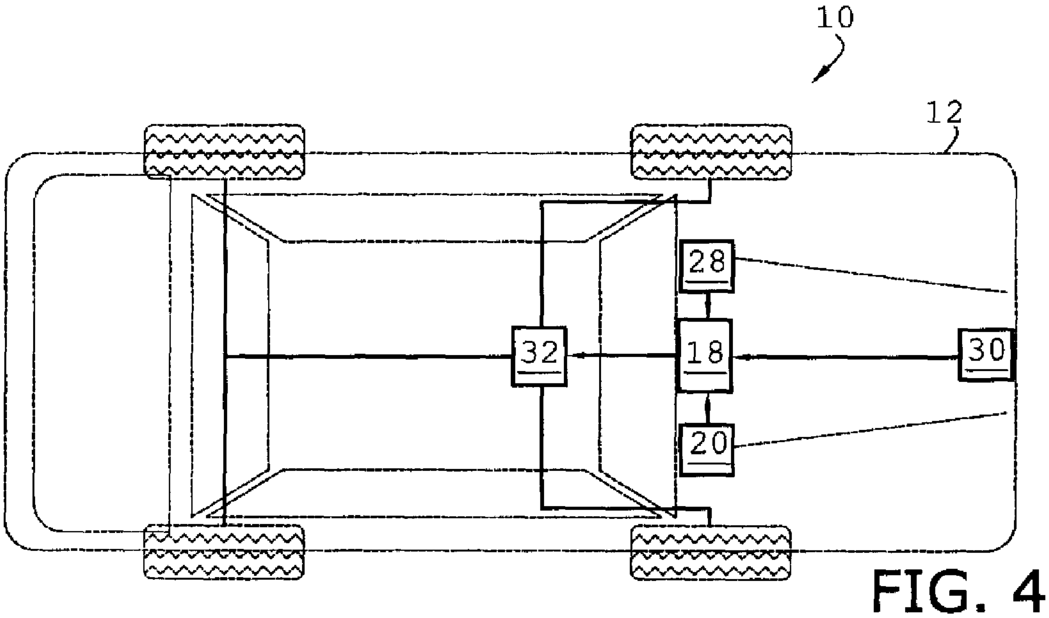
FIG. 4 is a plan view of a vehicle adapted for use in a first preferred embodiment of the present invention, particularly illustrating a sensor, in-vehicle navigational system and map database, locator device, and electronic control unit.
Figure 5:
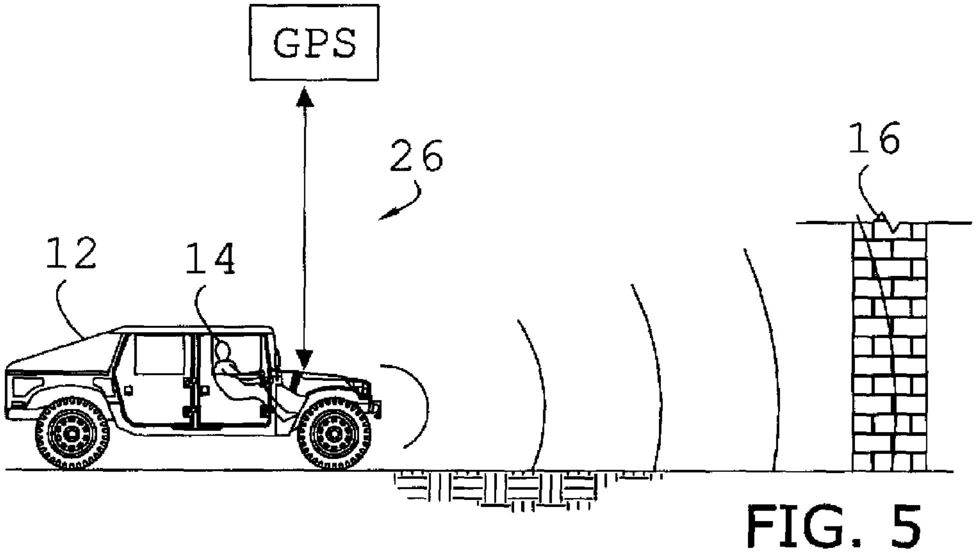
FIG. 5 is an elevation view of the adapted vehicle, particularly illustrating the operation of a GPS locator device.

As shown in FIGS. 4 and 5, the present invention concerns a collision avoidance system 10 adapted for use with a traveling host vehicle 12 and by an operator 14. In general, the system 10 fuses sensory (typically a radar subsystem) and database data to determine the presence of an overpass 16 within the forward vehicle path. An electronic control unit (ECU) 18 is programmably equipped to perform the various algorithms and functions described herein, and may consist of a single unit or a plurality of communicatively coupled intermediate or component control units configured to manipulate the input data prior to delivery to a central unit. As such, it is appreciated that the host vehicle 12 includes sufficient electrical and software functionality to effect the intended benefits, wherein said capabilities are readily determinable by one of ordinary skill in the art, and therefore, will not be further discussed.

Figure 6:
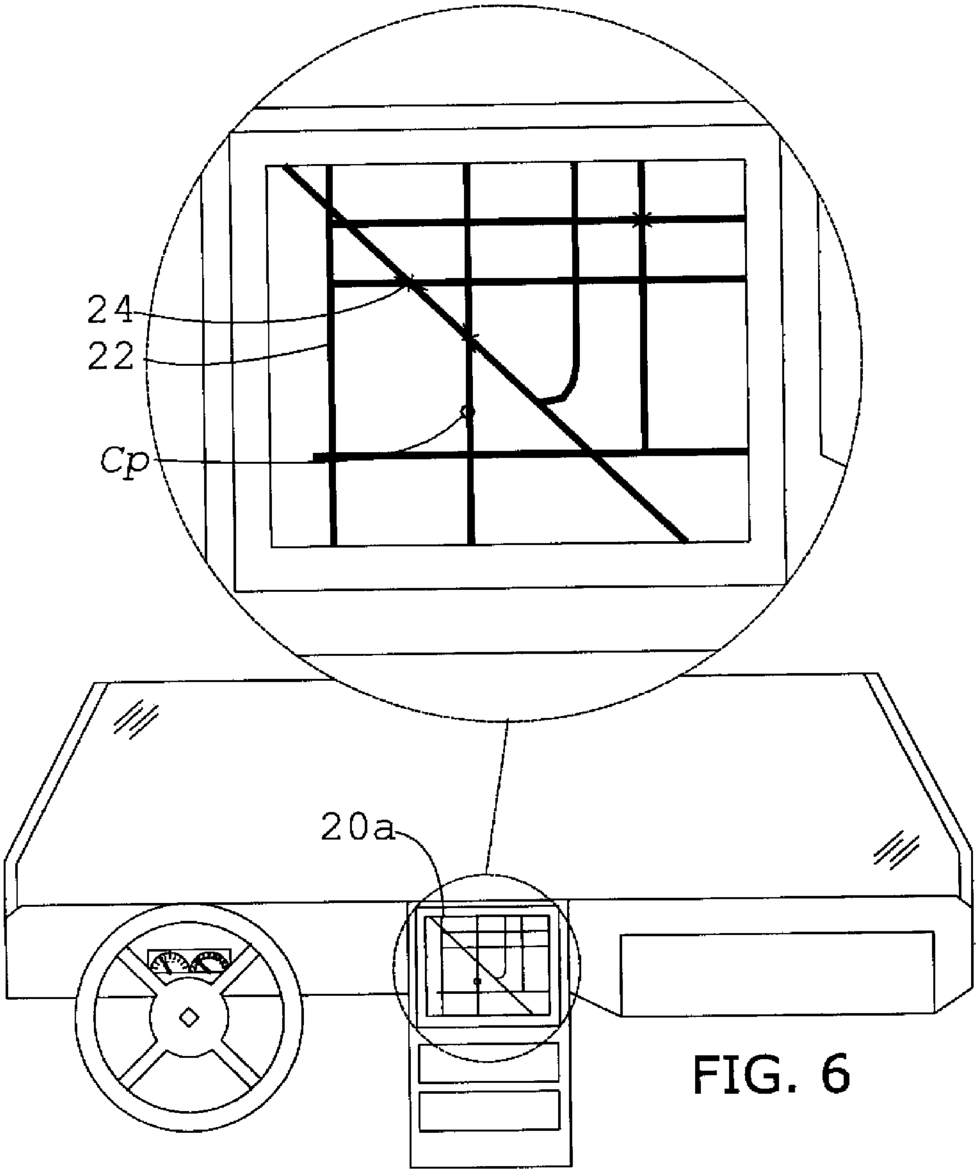
FIG. 6 is an elevation view of an in-vehicle dashboard monitor, particularly illustrating a map display including a plurality of links, and pre-determined overpass locations.

The system 10 includes an in-vehicle navigation system and updateable map database 20 that is communicatively coupled to the ECU 18. As shown in FIG. 6, the preferred vehicle map database 20 comprises a plurality of interconnected links (i.e. groupings of three-dimensional map points that represent thoroughfares) 22, and preferably denotes pre-determined above-grade or overpass locations 24 where two or more link 22 traverse each other at different grades. The area map, links 22, and overpass location 24 are preferably shown on a map display 20*a* perceivable by the operator 14. More preferably, each link 22 further presents traffic condition data, such as a maximum speed limit, or wet pavement conditions that could be utilized to improve warning determination.

The system 10 also includes a locator device 26 configured to locate the absolute position (e.g., latitude, longitude, and height) and preferably the heading of the host vehicle 12. As shown in FIGS. 4 and 5, the preferred locator device 26 includes a Global Positioning System (GPS) receiver 28 communicatively coupled to orbiting satellites, and a dead-reckoning system. Alternatively, the locator device 26 may utilize a network of cellular telephones, or a system using radio-frequency identification (RFID). The receiver 28 is communicatively coupled to the map database 20 and cooperatively configured to determine the current position coordinates, $C_p$, of the vehicle 12 on the map display 20*a*, as shown in FIG. 6.

As previously mentioned, the system 10 further includes at least one sensor 30 configured to detect the in-path object or overpass 16 at a minimum threshold distance. The sensor 30 may employ any suitable technology, including vision/camera, infrared, radar, lidar, or laser technology. For example, a long-range radar detector capable of detecting a single lane overpass from a minimum threshold distance of at least 150 meters, and more preferably 250 meters, may be utilized.

Figure 7:
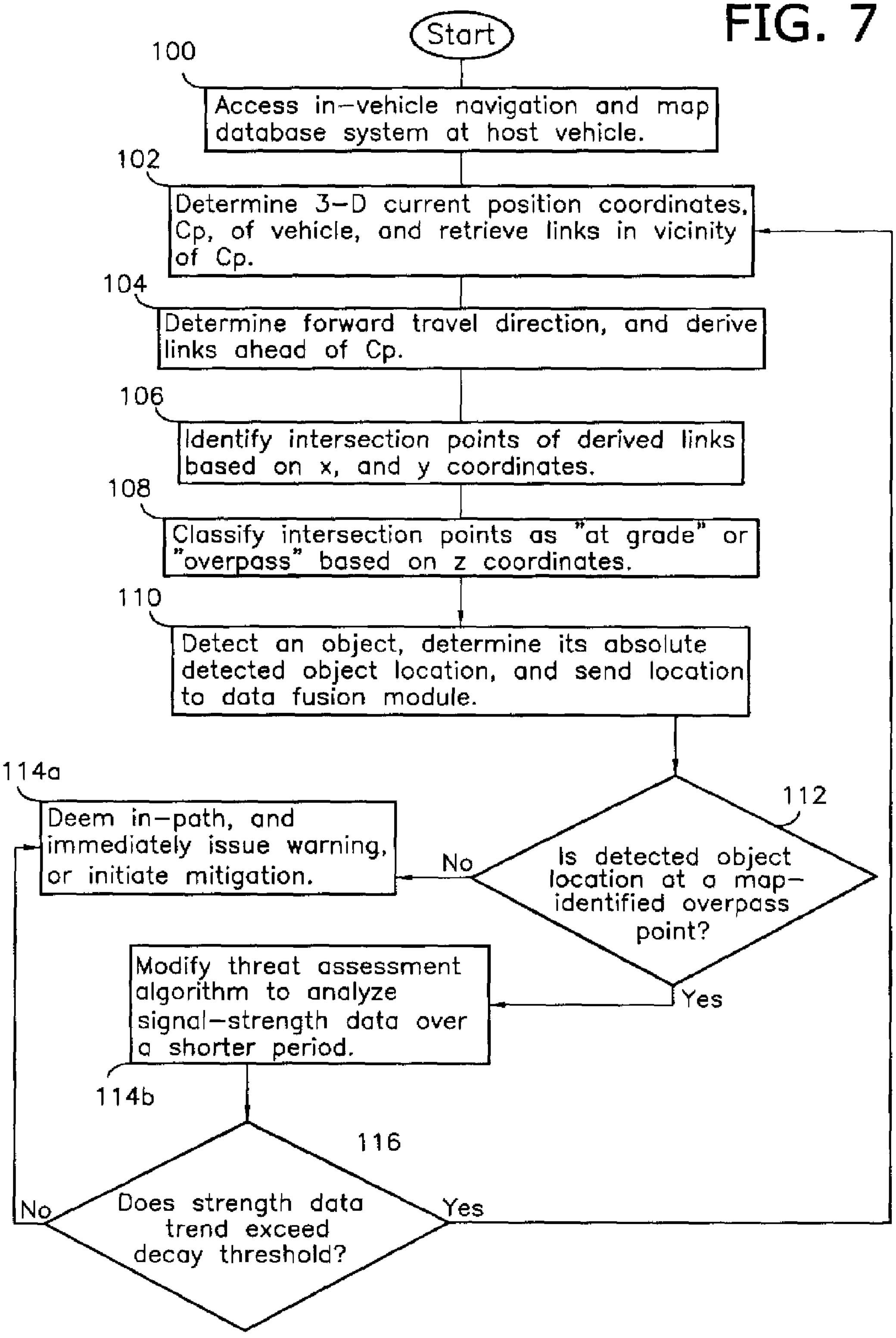
FIG. 7 is a flowchart of a method of performing the first preferred embodiment of the invention, wherein data from a radar sensor and map database are combined in a data fusion module.
Figure 9:
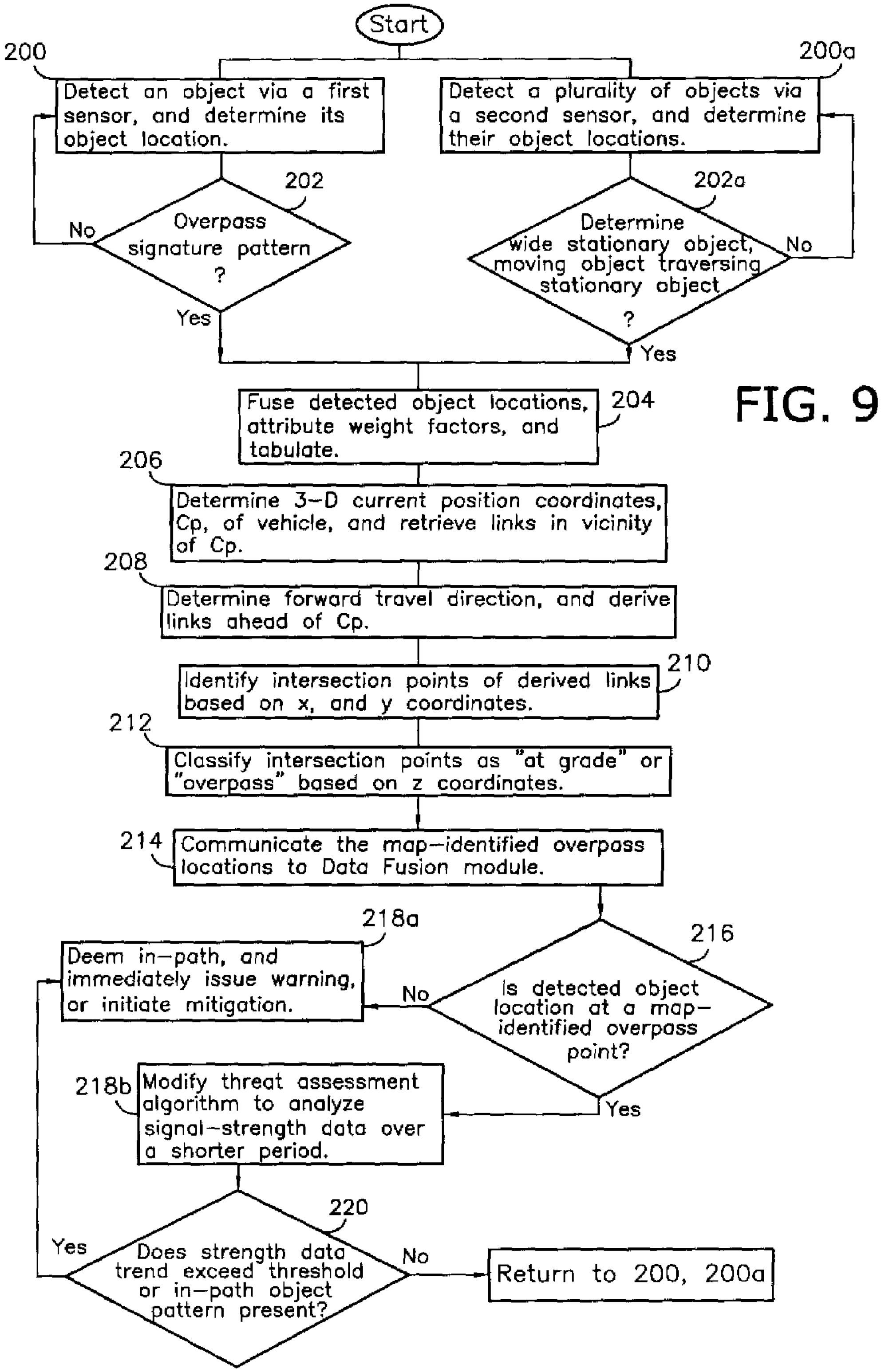
FIG. 9 is a flowchart of a method of performing the second preferred embodiment of the present invention, wherein data from the different sensors, and the map database are combined in the data fusion module.

As described in FIGS. 7 and 9, the map database 20, locator device 26, and sensor 30 are communicatively coupled and contribute input data to a data fusion module autonomously performed by the ECU 18. The ECU 18 fuses the input data to determine whether an overpass location is cross-corroborated by the individual sensors 30 and map database 20. If the data fusion module determines a corroborated overpass location, then the system 10 is further configured to cause to be generated a warning perceivable by the operator 14, and/or initiate a mitigating maneuver, when the threat assessment algorithm is satisfied. The following first and second embodiments of the invention exemplarily present two sensor/map database configurations that may be utilized:

1. Radar and Map Based Determination

In a first embodiment, a preferably pre-existing in-vehicle navigation system map database 20 is combined with a conventional radar-based overpass detection system. Once an object 16 is detected by the sensor 30, a sensor-detected range and relative object location are determined. The ECU 18, locator device 26, and map database 20 are cooperatively configured to search the forward map preview of the map database 20 for overpass locations 24 in the general vicinity (e.g., within 50 meters) of the detected object location. If a matching overpass location 24 is not found in the forward map preview, the preferred system 10 issues the warning immediately, so that sufficient distance separates the vehicle 12 from the object 16.

If, however, a matching overpass location 24 is found in the forward map preview, then the radar signal trend analysis module uses a lower threshold to look for a signature trend of diminishing amplitude (i.e. decay) of the radar return signal. That is to say, the radar signal analysis in this configuration may be performed over a period shorter than conventional assessment periods (e.g., a sample of two return signal strengths versus a sampling of three), so that the warning is issued to the vehicle 12 at a greater distance from the object 16. For example, if the trend presents a significant decay rate over a sample of $X_o \ldots X_n$ strengths, wherein the rate is taken from the differences between progressively succeeding strengths (i.e. $X_n$-$X_{n-1}$, etc.), then the object 16 is deemed an overpass; but if a significant decay trend is absent (e.g., the differences are positive), the object is deemed in-path, and a warning is issued, and/or mitigation action, such as actuating the braking module 32 of the vehicle 12, is initiated. It is appreciated that, despite a matching overpass location determination, radar-trend analysis is necessary to detect in-path objects that are located under the overpass.

As shown in FIG. 7, a preferred method of operation in the first embodiment includes a first step 100, wherein a map database 20 including a plurality of links is presented at a host vehicle 12. At a step 102, the current vehicle position is determined using a GPS navigation subsystem, and links in the vicinity of the vehicle 12 are retrieved from the map database 20. Next, at a step 104, the forward travel direction of the vehicle 12 is determined, and links in the immediate forward travel path of the vehicle 12 are further derived from the map database 20. At a step 106, the geometry of the derived links is determined from their geographic points, and intersection points (based on x,y coordinate values) are identified. At a step 108, intersection points are classified as either "at grade" or "overpass" based on the grade level (i.e., z coordinate value) provided at the points. Alternatively, it is appreciated that steps 100, 106 and 108 may be combined at step 100, in that the overpass locations 24 may be pre-identified and tabulated in the database.

At a step 110, a radar subsystem detects an object, determines a detected object location, and communicates it to the data fusion module. At a step 112, the module compares the detected object location to the overpass locations 24, such that if the detected object location does not correspond to a map-identified overpass location 24, then, at a step 114*a*, the detected object 16 is deemed in-path without considering signal strength trend data, and the warning is caused to be generated or mitigation is initiated. If, however, the detected object location does correspond to an overpass location 24, then, at step 114*b*, the radar subsystem and ECU 18 proceed with the process of analyzing the signal strength trend data of the object 16 over a truncated period, to decide whether it is an overpass. At a step 116, the trend is compared to a threshold to determine whether it presents a true in-path object. If the threshold is met, then the object 16 is deemed in-path, and a warning is caused to be generated, or a mitigating maneuver is caused to be initiated as per 114*a*; else the method returns to step 102.

2. Radar, Vision, and Map Determination

Figure 8:
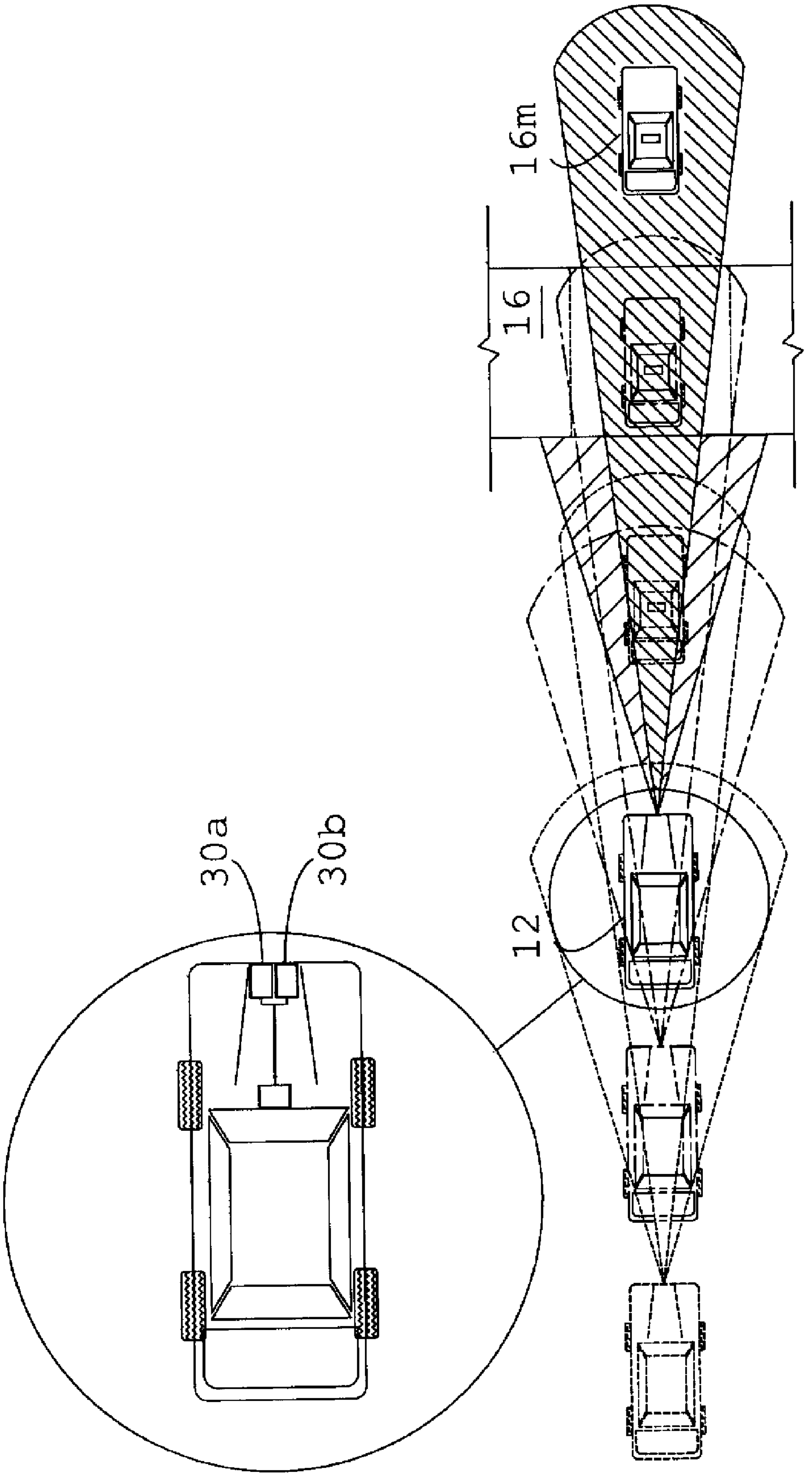
FIG. 8 is a plan view of a vehicle having first and second sensors, and adapted for use with a second preferred embodiment of the invention, wherein both sensors detect an approaching stationary object (overpass) located a minimum threshold distance from the vehicle, and the first sensor further detects a moving object (shown in hidden line) over a period, so as to obtain track data.

In a second preferred embodiment, the ECU 18 fuses input from a plurality of different sensors 30 and the map database 20 during overpass determination, to add redundancy and capability. In the illustrated embodiment shown in FIG. 8, for example, a vision or camera based sensor 30*b*, operable to detect the signature pattern of an approaching overpass, is utilized in addition to a radar subsystem 30*a*. The radar subsystem 30*a* is further configured to cooperatively determine track data for a plurality of objects and to analyze the data to determine whether a moving object 16*m* has passed through the location of a stationary object track. Similar to the first embodiment, the in-vehicle navigation system and map database 20 is utilized to determine whether an overpass location 24 exists that matches a sensory detected object location.

More particularly, the vision sensor 30*b* is configured to determine whether an overpass signature pattern is present, wherein, for example, the pattern may include the detection of a wide object across the field of view, a horizontal object relative to the ground plane, higher light intensity above the object (during daytime), and/or lower light intensity below the object (during daytime). Alternatively, a reflective surface, or other indicia can be positioned on the overpass, so as to directly communicate its presence to the sensor 30*b*. If an overpass signature pattern is determined, and/or the radar subsystem detects a moving object through a stationary track, then the map database 20 is consulted.

Referring to FIG. 9, a preferred method of performing the second embodiment of the invention starts at a first step 200, where an object 16 is detected by a vision sensor 30*b*, and its relative object location is determined. At a step 202, the detected object is evaluated to determine whether an overpass signature pattern is present. If an overpass signature pattern is determined, correlated input data is communicated to a data fusion module, and the method proceeds to step 204. If an overpass pattern is not determined, then the method returns to step 200.

Concurrently, at a step 200*a*, a radar subsystem 30*a* is used to track a plurality of objects by determining their relative object locations over a period. At a step 202*a*, the individual track data is examined to determine if there is a wide stationary object 16 that spans the width of the thoroughfare, and/or to detect the presence of a moving object 16*m* through the stationary object location. If a moving object is found to have traversed the stationary object location, then the radar-detected stationary object 16 is deemed an overpass, and correlated input data is communicated to the data fusion module proceeding to step 204; else, the radar subsystem returns to step 200*a*.

At a step 204, the data fusion module will combine overpass identified locations from each sensor 30*a,b*, and more preferably, attribute a weighted factor to those overpass locations detected by both sensors. At a step 206, the current position coordinates of the vehicle 12 are determined using a locator device 26, and links in the vicinity of the vehicle 12 are retrieved from the map database 20. From the current position coordinates, absolute position coordinates for the objects 16,16*m* can be determined from their relative positioning. Next, at a step 208, the heading, and forward travel direction of the vehicle 12 are determined, and links in the vicinity of the forward travel path of the vehicle 12 are retrieved from the map database 20. At a step 210, the geometry of the retrieved roads is determined from their map points, and approaching intersection points therewith are identified. At a step 212, intersection points are classified as either "at grade" or "overpass" based on the grade level indicia provided at the points. At step 214, the overpass determined intersection points are communicated to the data fusion module, and at step 216, compared to the sensor determined overpass locations.

Finally, at a step 216*a*, if a sensor-detected overpass location does not correspond to a map-identified overpass location 24, then the object 16 is deemed in-path and at-grade without considering signal strength trend data to eliminate the possibility that it is an overpass. In other words, where an detected overpass is not corroborated by the database 20, the system 10 will immediately issue a warning, even if both sensors 30*a,b* detected an overpass location. If, however, a sensor-detected overpass location does correspond to a map database overpass location 24, then the signal strength trend data is considered, at step 216*b*, to determine whether the object is in-path at grade level, or out of the grade level path, or where detected by the vision sensor only, further analysis can be made to determine whether an in-path object pattern is also present.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system or method not materially departing from but outside the literal scope of the invention as set forth in the following claims.

What is claimed is:

1. A collision avoidance system adapted for use with a host vehicle, and by an operator, said system comprising:

at least one sensor configured to detect an object located a minimum threshold distance from the vehicle, so as to determine a detected object location;

a map database including a plurality of intersecting thoroughfare links, wherein:

each link is a grouping of three-dimensional map points representing a segment of roadway navigable by the vehicle;

the intersecting links intersect at a location where two or more links traverse each other;

the database denotes predetermined overpass locations;

the overpass locations are where two or more links traverse each other at different grades; and the overpass locations are absolute position coordinates;

a locator device communicatively coupled to the map database, and configured to determine the current position coordinates of the vehicle within the map database; and an electronic control unit communicatively coupled to said at least one sensor, database, and device, and programmably configured to autonomously:

execute a warning assessment algorithm, compare the determined object location with the overpass locations, so as to determine whether the determined object location is generally at an overpass location, modify the warning assessment algorithm, when the determined object location is at a general overpass location, and cause a warning perceivable by the operator to be generated, or a mitigating maneuver by the vehicle to be performed, when the execution of the algorithm detects a potential collision.

2. The system as claimed in claim 1 wherein said at least one sensor utilizes a technology selected from the group consisting of radar, lidar, infrared, vision, and laser technologies.

3. The system as claimed in claim 2 wherein:

said sensor utilizes radar technology, and is configured to detect the object over a period, so as to determine a plurality of return signal strengths from the detection of the object; and said algorithm includes determining a trend in the difference between successive strengths, wherein the preceding strength is subtracted from the seceding strength.

4. The system as claimed in claim 3 wherein said unit is configured to cause the warning to generate when the trend is positive.

5. The system as claimed in claim 3 wherein the unit is configured to modify the algorithm by shortening the time period for the determining of the trend in the difference between successive strengths by reducing a quantity of samples of return signal strengths used in the determining of the trend when the detected object is at a general overpass location.

6. The system as claimed in claim 3 wherein said unit is configured to modify the algorithm, so as to cause the warning to be generated immediately upon detection of the object by the sensor, when the detected object is not at a general overpass location.

7. The system as claimed in claim 1 wherein:

said locator device includes a GPS receiver; and said unit, device, and database are further configured to retrieve a portion of the database within a predetermined vicinity of the current position coordinates, and compare the current position coordinates and the overpass locations within the portion.

8. A collision avoidance system adapted for use with a host vehicle, and by an operator, said system comprising:

a first sensor utilizing a first technology, and configured to detect a first stationary object located a minimum threshold general distance from the vehicle, so as to determine a sensor-detected object location;

a second sensor utilizing a second technology, and configured to detect the first object as the minimum threshold general distance from the vehicle;

a map database including a plurality of intersecting links, wherein:

each link is a grouping of three-dimensional map points representing a segment of roadway navigable by the vehicles;

the intersecting links intersect at a location where two or more links traverse each other;

the database denotes predetermined overpass locations; and the overpass locations are where two or more links traverse each other at different grades; and the overpass locations are absolute position coordinates;

a locator device communicatively coupled to the map database, and configured to determine the current position coordinates of the vehicle within the map database; and a electronic control unit communicatively coupled to the sensors, database, and device, and programmably configured to autonomously:

execute a warning assessment algorithm, compare the determined object location with the overpass locations, so as to determine whether the determined object location is generally at an overpass location, modify the warning assessment algorithm, when the determined object location is generally at an overpass location, and cause a warning perceivable by the operator to be generated, or a mitigating maneuver by the vehicle to be performed, when the execution of the algorithm detects a potential collision with the first object.

9. The system as claimed in claim 8 wherein:

said first sensor utilizes radar technology; and said second sensor utilizes vision technology.

10. The system as claimed in claim 9 wherein said first sensor and unit are cooperatively configured to further detect a second object, wherein the second object is moving, determine track data for the first and second objects over a first period of concurrent detection, and determine whether the second object passes through the location of the first object during the first period.

11. The system as claimed in claim 9 wherein said second sensor and unit are cooperatively configured to further detect the signature pattern of the first object, and determine whether the pattern presents an overpass.

12. The system as claimed in claim 11 wherein said signature pattern includes a wide object across the field of view, a horizontal longitudinal orientation relative to the ground plane.

13. The system as claimed in claim 12, wherein the pattern further includes higher light intensity above the object, and lower light intensity below the object, when the object is detected in daylight.

14. The system as claimed in claim 9 wherein:

said first sensor and unit are cooperatively configured to further detect the presence of a second object, wherein the second object is moving, determine track data for the objects over a first period of concurrent detection, and determine whether the second object passes through the location of the first object during the first period;

said second sensor and unit are cooperatively configured to further detect the signature pattern of the first object, and determine whether the pattern presents an overpass; and said unit is further configured to combine first sensor detected first object locations having second objects passing therethrough, and second sensor detected object locations having overpass signature patterns into a single table of overpass locations.

15. The system as claimed in claim 14 wherein said unit is further configured to modify the algorithm, when the second object passes through the location of the first object, or the pattern presents an overpass, and the detected object location is generally at an overpass location.

16. The system as claimed in claim 15 wherein:

said first sensor and unit are cooperatively configured to determine a plurality of return signal strengths from the detection of the first object; and said algorithm includes determining a trend in the difference between successive strengths.

17. The system as claimed in claim 16, wherein said unit is configured to modify the algorithm by reducing a quantity of samples of return signal strengths used in the determining of the trend, when the detected object is at a general overpass location.

18. The system as claimed in claim 16 wherein said unit is configured to modify the algorithm, so as to cause the warning to be generated immediately, when the detected object location is not at a general overpass location.

19. A method of modifying a first warning assessment algorithm of a sensor based collision avoidance system adapted for use with a vehicle, so as to reduce false alerts caused by overpasses, said method comprising the steps of:

a) autonomously determining the current position coordinates, and heading of the vehicle;

b) autonomously retrieving the absolute position coordinates of as least one overpass location within a predetermined vicinity ahead of the vehicle from a database;

c) detecting an approaching object at least a minimum threshold distance from the vehicle, and determining the detected position coordinates of the object;

d) comparing, using a programmable Electronic Control Unit (ECU), the detected position coordinates to the absolute position coordinates of said at least one overpass location from the database; and e) executing a second warning assessment algorithm, if the detected coordinates generally match the absolute position coordinates of a database overpass location, and a third warning assessment algorithm, if the detected coordinates do not match the position coordinates of a database overpass location, wherein said third warning assessment algorithm is executable over a shorter period than the second, and the second warning assessment algorithm is executable over a shorter period than the first.

* * * * *